United States Patent [19]

Hobart et al.

[11] Patent Number: 5,335,242

[45] Date of Patent: * Aug. 2, 1994

[54] RESONATOR FOR $CO_2$ SLAB WAVEGUIDE LASER

[75] Inventors: James L. Hobart, Los Altos Hills, Calif.; J. Michael Yarborough, Tucson, Ariz.; Joseph Dallarosa, Redwood City; Phillip Gardner, Cupertino, both of Calif.

[73] Assignee: Coherent, Inc., Santa Clara, Calif.

[ * ] Notice: The portion of the term of this patent subsequent to Jun. 16, 2009 has been disclaimed.

[21] Appl. No.: 57,321

[22] Filed: May 4, 1993

Related U.S. Application Data

[63] Continuation of Ser. No. 732,156, Jul. 18, 1991, abandoned, which is a continuation-in-part of Ser. No. 607,910, Nov. 1, 1990, abandoned, which is a continuation-in-part of Ser. No. 596,463, Oct. 12, 1990, Pat. No. 5,140,606, and a continuation of Ser. No. 596,788, Oct. 12, 1990, Pat. No. 5,123,028.

[51] Int. Cl.[5] ................................................ H01S 3/08
[52] U.S. Cl. .......................................... 372/95; 372/64
[58] Field of Search ..................... 372/95, 64, 87, 99

[56] References Cited

U.S. PATENT DOCUMENTS 5,123,028 6/1992 Hobart et al. ...................... 372/95

*Primary Examiner*—Georgia Y. Epps
*Attorney, Agent, or Firm*—Limbach & Limbach

[57] ABSTRACT

A $CO_2$ slab waveguide laser (10) is disclosed including a pair of spaced apart electrodes (36,38) having opposed light reflecting surfaces. The electrodes are dimensioned in a manner to guide light in a plane perpendicular to the reflecting surfaces. Light parallel to the reflecting surfaces is not constrained other than by the resonator mirrors (30,32). The resonator structure includes a negative branch unstable resonator in the nonwaveguide dimension. A stable resonator is used in the waveguide dimension but the mirror spacing from the end of the guide is based in part on the configuration of the unstable resonator. A unique support structure is disclosed for maintaining the electrodes in a spaced apart orientation without confining the discharge. Further refinements are disclosed for cooling the laser and for accommodating thermal expansion of the parts. An improved adjustable mirror assembly (26, 28) is provided which allows the tilt angle of the mirror to be varied from outside of the housing. The subject laser is capable of generating high energy short duration pulses which can be used to treat tissue with reduced trauma.

4 Claims, 11 Drawing Sheets

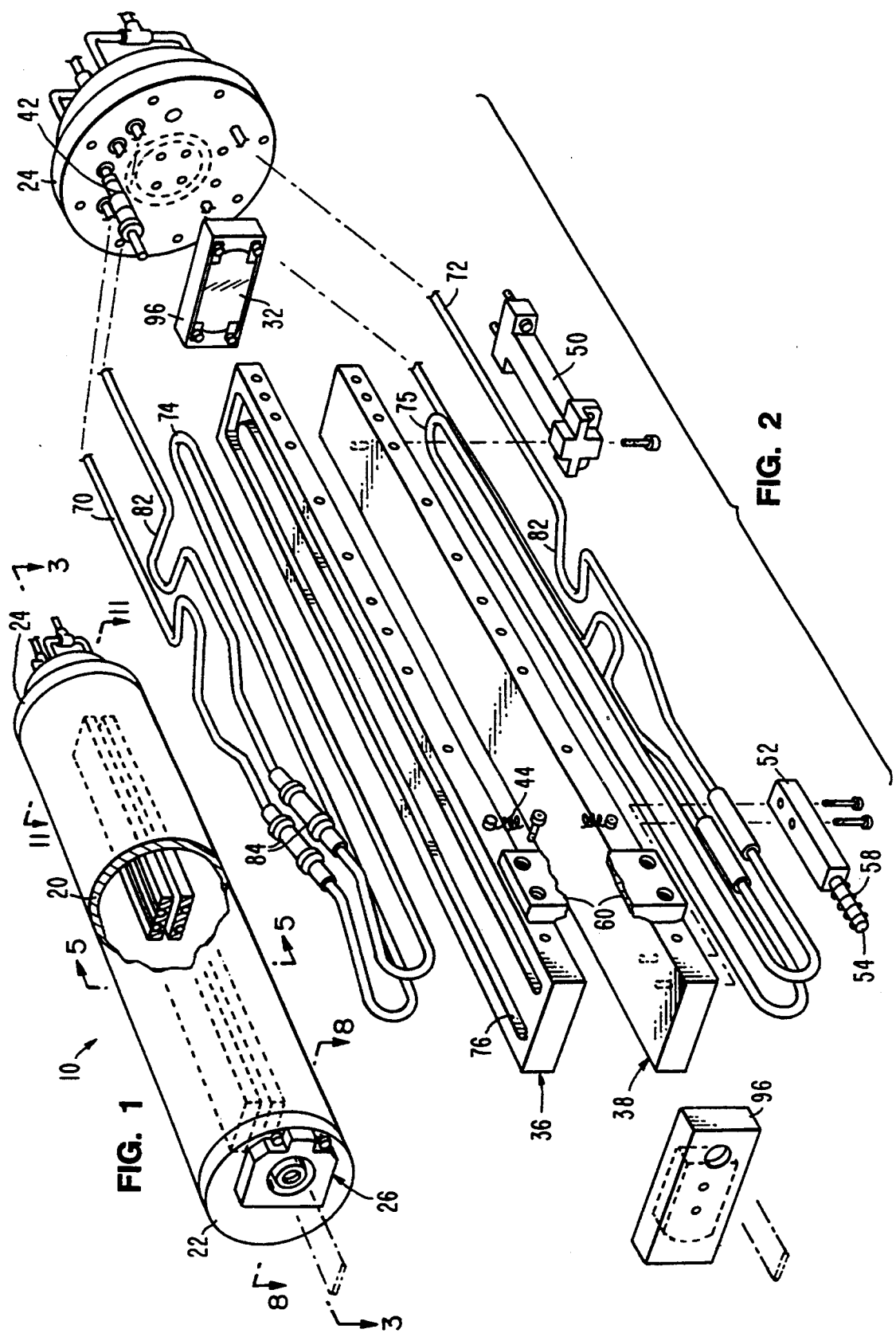

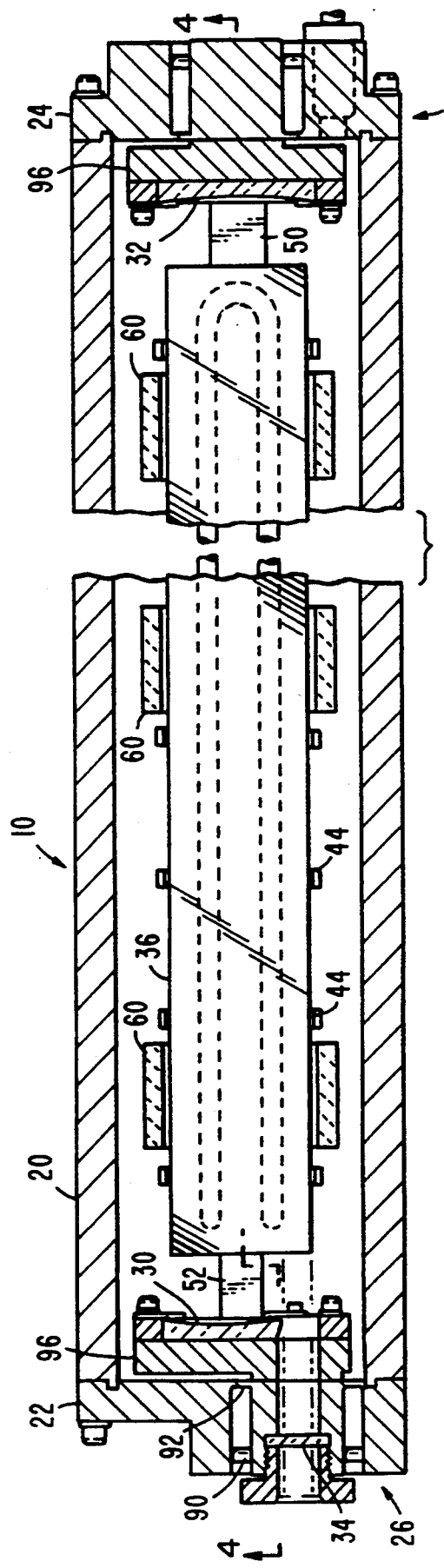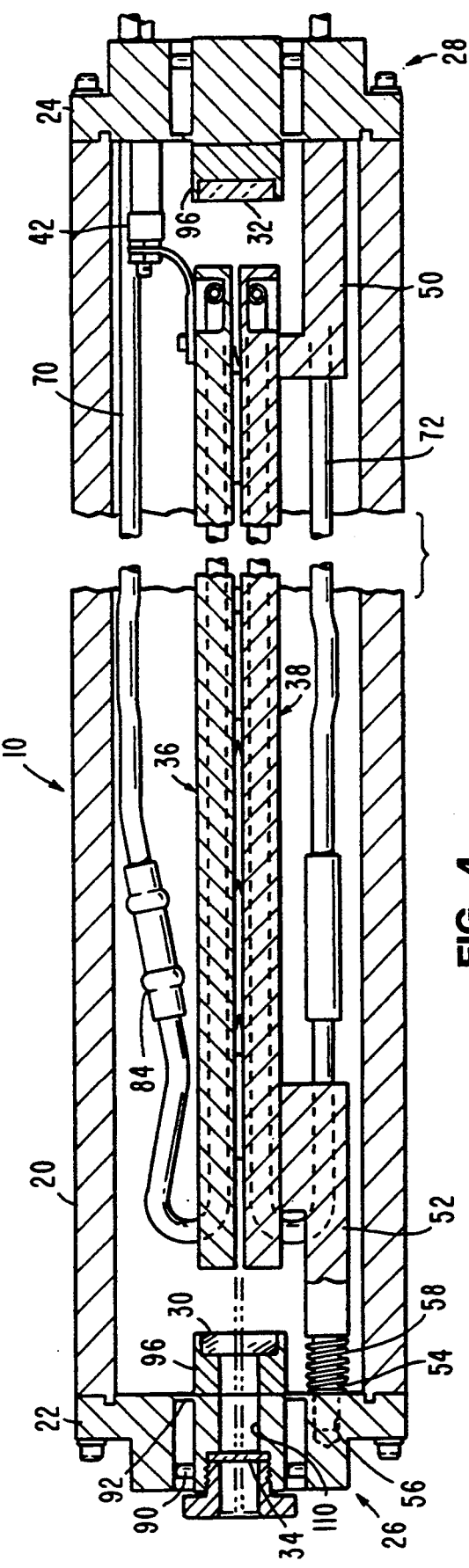

RESONATOR FOR $CO_2$ SLAB WAVEGUIDE LASER

This application is a continuation of U.S. Pat. application Ser. No. 07/732,156, filed Jul. 18, 1991 now abandoned, which is in turn a continuation-in-part of U.S. Pat. application Ser. No. 07/607,910, filed Nov. 1, 1990 now abandoned, which is in turn a continuation-in-part of U.S. Pat. application Ser. No. 07/596,463, filed Oct. 12, 1990 (U.S. Pat. No. 5,140,606, and U.S. Ser. No. 07/596,788, filed Oct. 12, 1990 (U.S. Pat. No. 5,123,028, issued Jun. 16, 1992).

TECHNICAL FIELD

The subject invention relates to an RF excited $CO_2$ slab waveguide laser which can generate short, high power pulses suitable for treating tissue.

BACKGROUND OF THE INVENTION

There has been considerable investigation into various forms of waveguide and slab $CO_2$ lasers. (See, "The Waveguide Laser: A Review," *Applied Physics*, Vol. 11, pages 1-33 (1976)) A waveguide laser differs from a conventional laser in that the circulating light is guided over some portion of the propagation path and does not obey the laws of free space propagation. The term slab has been used to describe lasers having a rectangular discharge region defined between two planar surfaces. With respect to the subject invention, the term slab waveguide laser will be used to describe a laser having a rectangular discharge region defined between two narrowly spaced electrodes wherein light is guided in the narrow dimension between the electrodes yet is allowed to propagate in free space in the wider dimension.

The initial work in slab waveguide $CO_2$ lasers was directed to flowing gas systems where the gas was excited with a DC discharge. (See, for example, "Optical-gain Measurements in a CW Transversedischarge, Transverse-gas-flow $CO_2$:$N_2$:He Planar-Waveguide Laser," McMullen et al., *Journal of Applied Physics*, Vol. 45, No. 11, Nov. 1974, pg. 5084) Efforts to extend the DC excitation approach to sealed $CO_2$ lasers were not particularly successful.

The first satisfactory excitation scheme for a sealed $CO_2$ waveguide laser is described in U.S. Pat. No. 4,169,251, issued Sept. 25, 1979 to Laakmann. The laser disclosed in this patent is transversely excited by a high frequency RF drive. The discharge region is defined between a pair of spaced apart, elongated electrodes. The Laakmann patent teaches how to select the proper RF excitation frequency based upon the spacing between the electrodes. Excitation with the proper RF frequency is necessary to maintain a stable discharge.

The electrodes of the laser disclosed in the Laakmann patent are spaced apart by a pair of elongated dielectric members. The combination of the electrodes and dielectric members can be used to define both square and rectangular discharge regions. In the embodiment illustrated in the patent, the spacing between the dielectric members is narrow enough so that light is guided in both dimensions, that is, between the electrodes and the dielectric members.

In a effort to increase the power which can be generated for a given length of electrodes, the teachings in the Laakmann patent have been applied to the development of $CO_2$ slab waveguide lasers, wherein the light is guided only between the narrowly spaced electrodes and is allowed to propagate freely in the wider dimension. One of the earliest reports on this type of laser can be found in "Radio-frequency Excited Stripline CO and $CO_2$ lasers," Gabai, Hertzberg and Yatsiv, Abstract presented at Conference on Lasers and Electro-optics, June 1984. In this laser, a pair of spaced apart water-cooled X-band waveguide electrodes were excited with an RF discharge at frequencies ranging from 25 to 50 MHz. The spacing between the electrodes was on the order of 4.5 mm, which was suitable for guiding light. The wider dimension of the electrodes was 2.5 cm which allowed the light to freely propagate. Cavity experiments were performed with plane mirrors and a stable resonator. Additional information can be found in a subsequent paper by Yatsiv, entitled "Conductively Cooled Capacitively Coupled RF Excited $CO_2$ Lasers," given at the Gas Flow & Chemical Lasers Conference, 1986 and published by Springer, Proceedings, 6th Int. Sym, pages 252-257, 1987.

Another $CO_2$ slab waveguide laser is described in U.S. Pat. No. 4,719,639, issued Jan. 12, 1988 to Tulip. Similar to the device described in the Gabai paper, the discharge region in the Tulip device is rectangular and configured to guide light between the electrodes while allowing the light to propagate in free space in the wider dimension. The Tulip patent also discloses that for a slab laser, it can be desirable to use an unstable resonator structure in the non-waveguide direction. The unstable resonator described in Tulip includes one concave mirror and one convex mirror and is known in the art as a positive branch unstable resonator.

Still another slab waveguide laser is described in "$CO_2$ Large-area Discharge Laser Using an Unstable-waveguide waveguide Hybrid Resonator," Jackson et al., *Applied Physics Letters*, Vol. 54, No. 20, page 1950, May 1989. As in the laser described in the Tulip patent, the laser of this latter article was provided with a positive branch unstable resonator in the nonwaveguide direction.

Still another slab waveguide laser is disclosed in U.S. Pat. No. 4,939.,738, issued Jul. 3, 1990 to Opower. This slab waveguide laser is also provided with a positive branch unstable resonator.

Many of the initial $CO_2$ slab waveguide laser designs reported in the prior literature while showing promise, have not been suitable for commercial exploitation. More particularly, most of the lasers described were essentially for experimental purposes and little effort was expended to overcome problems faced when attempting to operate the lasers at high power levels for extended periods of time. For example, in order to provide a commercially acceptable laser, various design issues must be addressed including mirror assemblies, cooling systems and electrode support structures.

Another problem with the prior art slab lasers is that their resonator structures included mirrors which were located quite close to the discharge and therefore subject to rapid degradation. This resonator construction followed the conventional wisdom of waveguide laser design which specifies the optimum placement and radius of the resonator mirrors. More specifically, prior art theory specified that the mirrors should either be located very close to the ends of the waveguide elements or spaced a large distance away. By placing the mirrors close to the end of the waveguide, it was felt that all of the light could be forced back into the waveguide channel. A cavity design where the mirrors are placed close to the end of the waveguide was said to have a Type I resonator. Mirrors used in a Type I resonator were typically flat, or had a very large radius of curvature. While a Type I resonator is fine for experimentation, degradation of the mirrors due to exposure to the nearby discharge renders this approach unsuitable for commercial applications.

The prior art waveguide theory also specified that there would be two additional locations, spaced far from the end of the waveguide, where mirrors could be placed and losses could still be minimized. These locations were a function of the separation between the electrodes and for convenience were labeled R and R/2. If the mirrors were placed at a distance R from the end of the waveguide, the resonator was called a Type II. If the mirrors were located at the distance R/2, the resonator was called as Type III. The radius of curvature of the mirrors in both a Type II and Type III resonators is equal to R. The distance R in a typical waveguide configuration turns out to range from about 10 cm to one meter. This additional spacing of both mirrors away from the ends of the waveguide is unacceptable in a commercial laser design since it would add additional space to the laser package and create potential alignment stability problems.

Accordingly, it is an object of the subject invention to provide a new and improved $CO_2$ slab waveguide laser.

It is a further object of the subject invention to provide a $CO_2$ slab waveguide laser which is stable and generates a high power output for a given length.

It is another object of the subject invention to provide a $CO_2$ slab waveguide laser having an improved resonator structure.

It is still a further object of the subject invention to provide a $CO_2$ slab waveguide laser having a negative branch unstable resonator in the nonwaveguide direction.

It is still another object of the subject invention to provide a $CO_2$ slab waveguide laser having the resonator mirrors spaced away from the ends of the guide to reduce degradation.

It is still a further object of the subject invention to provide a $CO_2$ slab waveguide laser having the resonator mirror spacing governed by the geometry of the negative branch unstable resonator.

It is still another object of the subject invention to provide a $CO_2$ slab waveguide laser having an improved electrode support structure.

It is still a further object of the subject invention to provide a $CO_2$ slab waveguide laser having an electrode support structure which allows for thermal expansion of the electrodes.

It is still another object of the subject invention to provide a $CO_2$ slab waveguide laser having an electrode support structure which does not confine the discharge.

It is still a further object of the subject invention to provide a $CO_2$ slab waveguide laser having an improved system for cooling the electrodes.

It is still another object of the subject invention to provide a $CO_2$ slab waveguide laser having improved mirror mounts which allow adjustment from outside the sealed laser housing.

It is still a further object of the subject invention to provide a means for preionizing the discharge to facilitate operation.

It is still another object of the subject invention to provide a laser for generating short, high energy pulses suitable for treating tissue.

SUMMARY OF THE INVENTION

In accordance with these and many other objects, the subject invention provides for a $CO_2$ slab waveguide laser with a number of features designed to enhance performance. The slab laser consists of a pair of spaced apart, planar electrodes having opposed light reflecting surfaces. The spacing of the electrodes is arranged such that light will be guided in a plane perpendicular to the reflecting surfaces. In contrast, the light in the plane parallel to the light reflecting surfaces is allowed to propagate in free space and is only confined by the resonator.

In one aspect of the subject invention, a new resonator structure is used to provide added stability and improved mode quality. More specifically, a negative branch unstable resonator structure is selected for reflecting light in the nonwaveguide dimension. While negative branch unstable resonators have been used in other lasers, it does not appear that this structure has been used with a $CO_2$ slab waveguide laser. It is believed that prior investigators incorrectly assumed that a negative branch unstable resonator would substantially reduce power output from such a laser. It has been found that the negative branch unstable resonator can be used without a significant reduction in power.

Another feature of the novel resonator design is that the mirrors are spaced a sufficient distance from the ends of the waveguide to reduce degradation problems. This mirror spacing does not follow prior art teachings for waveguide structures. More specifically, the mirrors are spaced from the ends of the guide a distance significantly greater than in a Type I resonator. In addition, the mirrors are also much closer to the end of the guide than in either a Type II or Type III resonator.

In accordance with the subject invention, the mirror separation and curvature is initially selected based on the desired optical output coupling of the negative branch unstable portion of the resonator. Preferably spherical mirrors are used to minimize costs. Thus, the radius of curvature of the mirrors in both the waveguide and nonwaveguide dimensions will be the same.

Once the mirror separation and curvature are selected for the nonwaveguide dimension, the length of the waveguide is selected so that the spacing between the ends of the guide and mirrors optimizes reflection of the light back into the guide. In accordance with the subject approach, this optimization is achieved by setting the length of the guide so that the radius of curvature of the wavefront of the laser beam at the mirror location matches the selected radius of curvature of the mirrors. It has been found that this approach maximizes power output even though prior theory would indicate that losses of roughly fifteen percent would occur.

Another important feature of the subject laser resides in the support structure used to maintain the separation of the electrodes. More specifically, in the prior art, the separation of the electrodes was achieved by mounting a pair of elongated dielectric blocks between the electrodes. This approach provided the necessary electrical isolation between the electrodes. However, the dielectric blocks tend to sharply define the edge of the discharge.

In contrast, in accordance with the subject invention, the means for supporting and isolating the electrodes is spaced from the discharge. In this manner, the discharge is not sharply limited but presents an apodized or gentle edge. It is believed that this configuration contributes to the superior mode performance of the laser. Another advantage to this configuration is that it allows the hot, dissociated laser gas to flow freely out of the space between the electrodes while allowing cooler gas to enter and replenish the discharge.

In another aspect of the electrode support structure, consideration is given to accommodating the thermal expansion of the electrodes during operation. Accordingly, one end of an electrode is fixedly attached to one end of the housing. The other end of the electrode is slidably mounted to the other end of the housing to allow movement caused by thermal expansion.

The subject invention also includes an improved cooling system. As can be appreciated, as a laser is run at higher powers, cooling becomes more important. In the past, cooling pipes were simply attached to the surface of the electrodes. In the subject design, the cooling pipes are located in channels formed into the electrodes. Moreover, the specific location of the channels is designed to minimize stresses created due to differences in the coefficient of thermal expansion between the material of the pipes and the electrodes. The cooling pipes are also designed to minimize shorting between the high voltage electrode and grounded laser housing.

Another feature of the subject laser is an improved mirror assembly. This mirror assembly allows the angle of the resonator mirrors to be adjusted from outside of the housing without any need for sliding vacuum seals.

Another feature of the subject laser is the inclusion of a low pressure mercury-argon lamp used to preionize the discharge. The lamp allows the laser to start reliably even at low operating currents.

The subject laser is capable of generating short, high energy pulses which are particularly suitable for treating tissue.

Further objects and advantages of the subject invention will become apparent from the following detailed description, taken in conjunction with the drawings in which:

BRIEF DESCRIPTION OF THE DRAWINGS

FIG. 1 is a perspective view, partially in section, of the $CO_2$ slab waveguide laser of the subject invention.

FIG. 2 is an exploded perspective view of the $CO_2$ slab waveguide laser of the subject invention.

FIG. 3 is a cross sectional view of the $CO_2$ slab waveguide laser of the subject invention taken along the lines 3—3 of FIG. 1.

FIG. 4 is a cross sectional view of the $CO_2$ slab waveguide laser of the subject invention taken along the lines 4—4 of FIG. 3.

DETAILED DESCRIPTION OF THE PREFERRED EMBODIMENT

Figure 5:
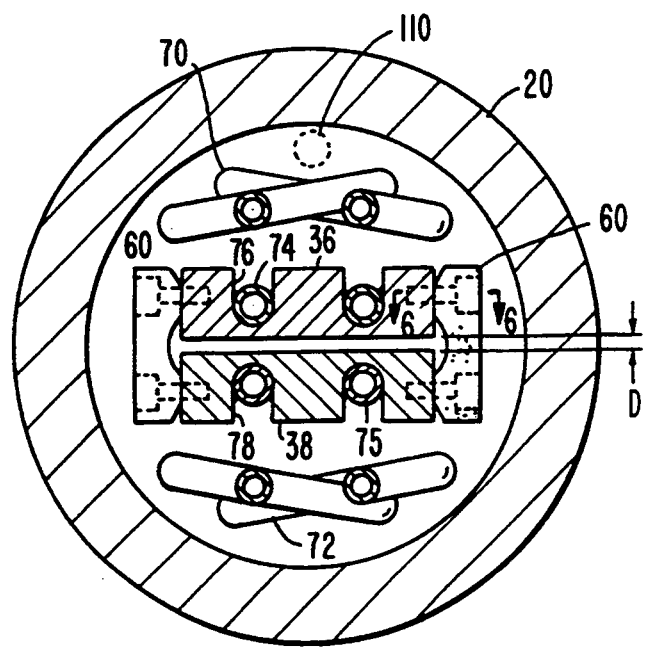
FIG. 5 is a cross sectional view of the $CO_2$ slab waveguide laser of the subject invention taken along the lines 5—5 of FIG. 1.

Turning to FIGS. 1 through 5, there is illustrated the $CO_2$ slab waveguide laser 10 of the subject invention. The major parts of the laser 10 include a cylindrical aluminum housing 20 which is vacuum sealed by a pair of end plates 22 and 24. The end plates include the adjustable mirror mount assemblies of the subject invention shown generally as 26 and 28. The mirror mount assemblies support resonator mirrors 30 and 32. As seen in FIG. 3, mirror 30 is shorter than mirror 32 for coupling light out of the cavity. Mirror assembly 26 also supports a window 34 for transmitting the light passing by the end of mirror 30 out of the housing.

Within the housing 20 there are mounted a pair of planar aluminum upper and lower electrodes 36 and 38. The spacing D (FIG. 5) between the electrodes is selected such that light will be guided between the opposed, inner surfaces of the electrodes. In the preferred embodiment, the spacing D is equal to 2 mm. In the subject design, there are no confining elements in the plane perpendicular to the light reflecting surfaces such that laser light is free to propagate in free space controlled only by the resonator mirrors 30 and 32.

To minimize losses, the inner light reflecting surfaces of the electrodes are machined flat to be within 0.002 inches. In addition, the surface finish is smooth to within 32 rms microinches. In the illustrated embodiment, each electrode is 44 mm wide, 12 mm thick and 61.52 cm long.

In the preferred embodiment, the lasing medium is standard $CO_2$ lasing mixture for generating radiation at a principal wavelength of 10.6 microns. The mixture includes helium, nitrogen and carbon dioxide with a 3:1:1 ratio plus the addition of five percent xenon. The gas is maintained between 50 and 110 torr and preferably on the order of about 80 torr. The gas is electrically excited by coupling a radio frequency generator between the electrodes. A standard, solid state RF generator was used which generated an output at 81.36 MHz at greater than four kilowatts. The output of the generator is coupled into the laser using a suitable impedance matching network (not shown) which matches the generator to the lit discharge. In this embodiment, the RF current is connected to the hot electrode 36 at one point through standard insulated electrical feed through 42 that is located as close as possible to the attachment point.

The other electrode 38 and the housing 20 are connected to ground. A plurality of inductance coils 44 are electrically connected between the electrodes to cancel any capacitance effects and control the voltage distribution along the electrode. Preferably, the resonant frequency of the electrodes with the added inductors is within a few MHz of the RF excitation frequency.

As noted above, the subject laser includes an improved support system for the electrodes. More specifically, the lower electrode 38 is connected to end plate 24 via a support bracket 50. The other end of the lower electrode 38 is supported by a second support bracket 52. The second support bracket is rigidly connected to the electrode. The free end of the bracket 52 includes a pin 54 which projects into a complementary mating recess 56 in end plate 22. The extent to which the pin is received in the recess will vary as the length of electrode 38 varies during operation of the laser. In this manner, the electrode is not constrained in a manner which could result in warping and deviation from the desired separation between the electrodes.

In the illustrated embodiment, a spring 58 is mounted on pin 54 of the second support member in a manner to abut the end plate 22. The spring functions to provide an electrical connection further grounding electrode 38.

As noted above, in the prior art slab lasers, the pair of electrodes were typically separated by elongated dielectric blocks which also confined the discharge and produced hard edges to the electrical field. In contrast, in the subject laser, the means for supporting the upper electrode from the lower electrode is spaced away from the discharge so that sides of the discharge are apodized.

Figure 6:
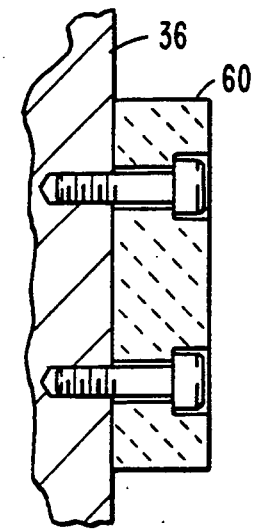
FIG. 6 is a cross sectional view of the $CO_2$ slab waveguide laser of the subject invention taken along the lines 6—6 of FIG. 5.
Figure 7:
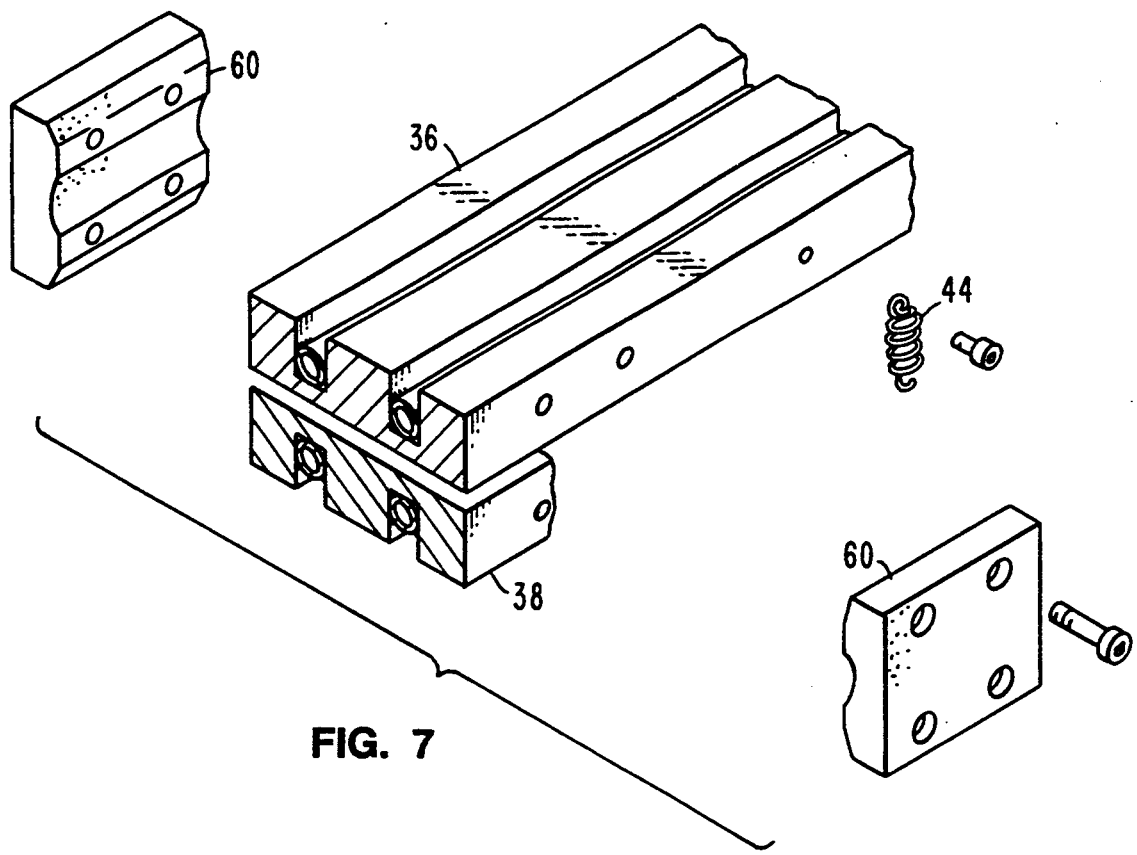
FIG. 7 is an exploded view of a portion of the novel electrode support system of the $CO_2$ slab waveguide laser of the subject invention.
Figure 9:
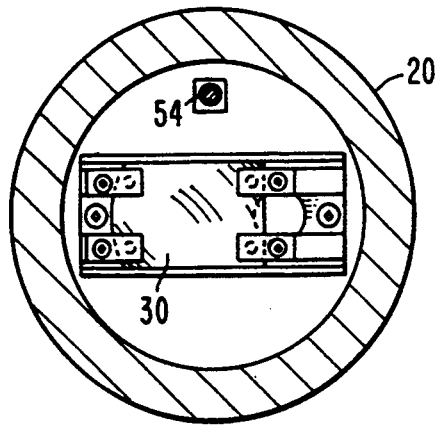
FIG. 9 is a cross sectional view of the mirror mount of the laser of the subject invention taken along the lines 9—9 of FIG. 8.

As best seen in FIGS. 6 and 7, the support means includes a plurality dielectric brackets 60. In the preferred embodiment, there are only three narrow brackets 60 on each side of the electrodes so that the discharge is substantially unblocked. Moreover, the brackets are generally U-shaped such that center of each bracket is spaced beyond the discharge. By this arrangement, the discharge is only confined by the electric field and presents a much smoother fall off in density near the edges. It is believed that this design contributes to improve mode performance. Another advantage to this configuration is that it allows the hot, dissociated laser gas to flow freely out of the space between the electrodes while allowing cooler gas to enter and replenish the discharge. Still another advantage to this design is that the discharge can be observed if windows are placed in the housing.

In order for the laser to operate effectively at higher powers, a cooling system must be provided to carry heat away from the electrodes. In the subject invention, the cooling system includes a pair of upper and lower fluid carrying copper pipes 70 and 72. The ends of pipes 70, 72 pass through and are electrically grounded to the end plate 24 of housing 20. The end segments of each of pipe run along the length of the electrodes close to the inner surface of the housing. Each pipe includes a center segment 74,75 which runs down and back along the electrode.

In accordance with the subject invention, the outer surfaces of the electrodes are provided with channels 76 and 78 for receiving the pipes. Preferably, the bottom of each channel is nickel plated and the center segments 74,75 are soldered into the channel to maximize heat conduction. The depth of the channels are arranged to be close to the geometric center of the electrodes. In this manner, any warping of the electrodes which might arise due to stresses that are created because of the different thermal expansion rates of the pipes and electrodes will tend to be minimized.

As seen best in FIGS. 2, the end segments of both pipes are provided with U-shaped bend sections 82 which are also twisted out of plane. These sections provide some flexibility for movement of the pipes as they expand due to heat.

The upper cooling pipe 70 is further provided with a pair of insulated sections 84. The insulated sections 84 function to electrically isolate the center segment 74 of the pipe, which is electrically hot, from the remainder of the pipe which is electrically grounded. In the preferred embodiment, the end segments of the pipe are located very close to the grounded housing. The insulative sections 84 are angularly oriented so that the electrically hot portions of the pipe are spaced away from the grounded housing and placed closer to the hot electrode 36.

As will be discussed in greater detail below, the selection of mirror spacing in the subject laser is important for maximizing power and improved mode control. It is desirable to place the mirrors 30, 32 far enough away from the end of the electrodes so the degradation from the discharge is minimized. On the other hand, the mirrors must not be spaced so far away as to make the overall container unwieldy. In order to meet this requirement from a packaging standpoint, it is necessary to place the mirrors inside the housing 20. It is also necessary to provide a means to adjust the angle of the mirrors from outside the sealed housing to maximize performance.

The latter goals are achieved through the use of improved mirror assemblies 26 and 28. As will be seen, these two assemblies are functionally equivalent. The only difference is that assembly 26 includes a window 34 for transmitting the laser light.

The mirror assemblies are best seen in FIGS. 8 through 12. Each mirror assembly is formed in an end plate 22, 24 and includes a circular groove 90. The groove extends towards the inner surface of the end plate an amount sufficient to define a radially extending, planar flexure area 92. The groove 90 also defines a tilt member 94 located radially inside the groove.

A mirror mount 96 is connected to the tilt member 94 on the inner surface of the end plate. As can be appreciated, if the angle of the tilt member is varied, the angle of the mirror mount 96 will similarly be varied.

Figure 13:
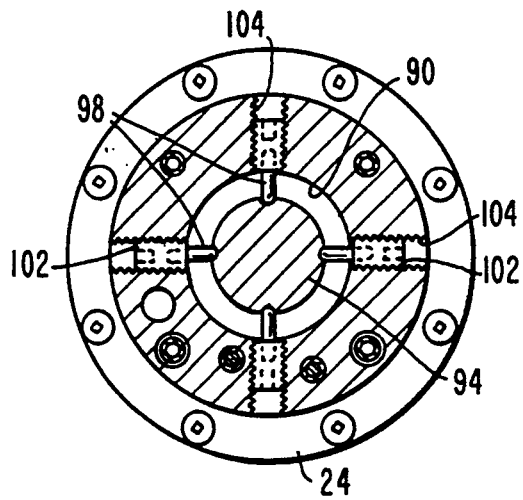
FIG. 13 is a cross sectional view of the mirror mount of the laser of the subject invention taken along the lines 13—13 of FIG. 11.
Figure 8:
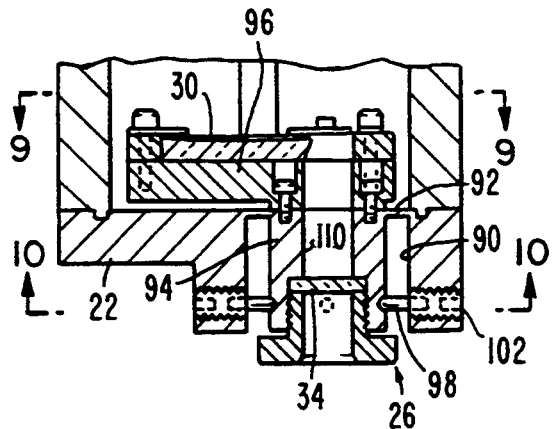
FIG. 8 is a cross sectional view of the mirror mount and output window of the laser of the subject invention taken along the lines 8—8 of FIG. 1.
Figure 11:
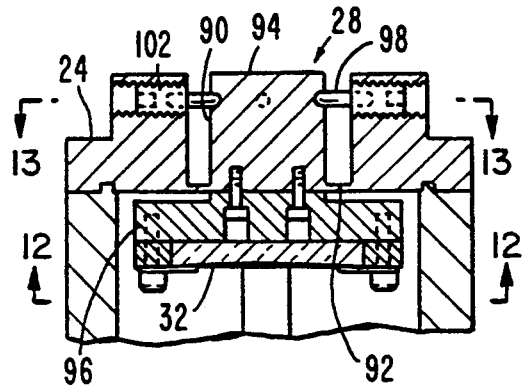
FIG. 11 is a cross sectional view of the other mirror mount of the laser of the subject invention taken along the lines 11—11 of FIG. 1.
Figure 10:
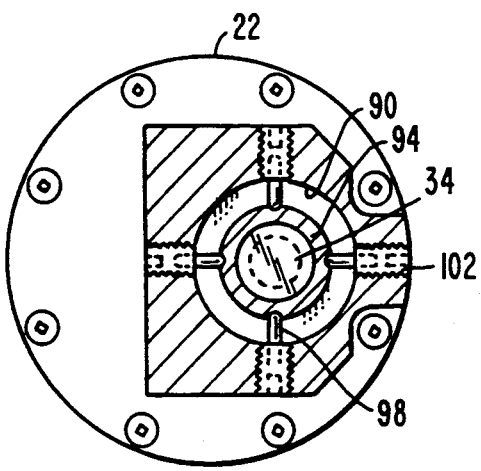
FIG. 10 is a cross sectional view of the mirror mount and output window of the laser of the subject invention taken along the lines 10—10 of FIG. 8.
Figure 12:
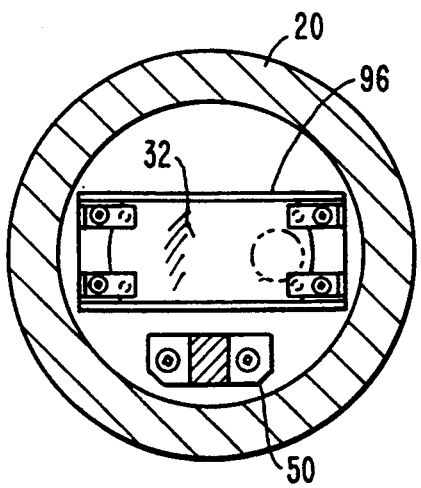
FIG. 12 is a cross sectional view of the mirror mount of the laser of the subject invention taken along the lines 12—12 of FIG. 11.

The mirror assembly includes a means for adjusting the angle of the tilt member. More specifically, and as best seen in FIGS. 10 and 13, four pins 98 are slidably mounted in the end plate in a manner to pass through groove 90 and contact tilt member 94. Associated with each pin 98 is a screw member 102 which is threadably engaged with a complementary opening 104. By rotating a screw member, the associated pin can be driven against the tilt member 94. As can be seen in FIGS. 8 and 11, as a pin is driven into the tilt member, the tilt member will tend to rotate about the radial flexure region 92. By adjusting the positions of the screw members and pins, the mirrors can be angularly adjusted from the outside of the housing.

The mirrors 30 and 32 are fixedly mounted to the mirror mounts 96. Each mirror includes a silicon substrate to which is coated a metal coating of either gold or silver and this is then overcoated with a dielectric stack of thorium fluoride and zinc sulfide to enhance the mirror reflectivity at the laser wavelength. To further protect the mirror from degradation, a very thin top coating having a thickness of about 2 microns can be added. Suitable materials for the top coating include an extra layer of thorium fluoride or germanium. Germanium better resists the type of scratches which occur from handling but is more subject to absorption problems at higher powers. The extra coating layer does cause some added losses which must be balanced against improved lifetime.

As discussed above, stability, power output and mode control have been enhanced with the resonator structure of the subject laser. The resonator structure is best seen in FIGS. 3 and 4. More specifically, and as seen in FIG. 3, the mirrors 30 and 32 define a negative branch unstable resonator in the slab or nonwaveguide dimension. A confocal unstable resonator is the desired resonator configuration in order to produce a collimated output beam and to achieve the maximum laser efficiency. As noted above, mirror 30 is shorter than mirror 32 and therefore light is coupled out of the resonator just past the end of mirror 30, through opening 110 and past window 34. The resonator is considered a negative branch unstable resonator because the beam crosses the optical axis an odd number of times, in this case, once. As noted above, in the prior art $CO_2$ slab waveguide lasers, only positive branch unstable resonators have been used. It is believed that despite the conventional wisdom, the negative branch unstable resonator provides enhanced performance.

In the preferred method of designing the resonator, it was first determined what would be a desirable length for the gain medium. Then the desired output coupling was selected. In this case, it is preferable to have the output coupling be on the order of 16%. Using these two figures, the radius of curvature of the two mirrors were selected based on the following standard formulas:

(1) $(R_1+R_2)/2=$ Mirror spacing for confocal conditions and for filling the gain medium on one pass of the collimated beam.

(2) $(M-1)/M=21\%$ (desired output coupling) where M is equal to the magnification and is given by:

(3) $R_2/R_1=$ Magnification

In the embodiment wherein the electrode length is 60 cm, the radius of curvature of the full size mirror 32 is 730 mm and the shorter mirror 30 is 580 mm and the spacing between the mirrors is half the average curvature or 655 mm. Both of the mirrors are spherical and therefore have the same radius of curvature in both dimensions.

The shorter mirror 30 or output mirror must be cut so that the spacing between the edge of the mirror and the edge of the discharge allows the proper fraction of the beam to pass out of the resonator. The dimensions of this mirror depend on the width of the electrodes less a small correction for edge effects and mechanical tolerances. The small mirror must be cut so that the output beam width is the fractional output coupling times the effective width of the electrode. For the above example, the electrodes were 44 mm wide with 1 mm for the edge and mechanical tolerances. Thus the width of the output beam is:

(4) $0.21\times(44-1)\text{mm}=8.8$ mm

Experiments have been performed with 40 cm electrodes. The following negative branch unstable resonator designs have been found acceptable.

|  | Case I | Case II |
| --- | --- | --- |
| Radius of Mirror 30 | 384 mm | 377 mm |
| Radius of Mirror 32 | 420 mm | 430 mm |
| Spacing L | 402 mm | 403 mm |

FIG. 4 illustrates the waveguide dimension where a stable resonator is defined. As noted above, in the prior art waveguide lasers, the mirrors where placed quite close to the ends of the waveguide, usually less than 4 mm away which approached a Type I resonator configuration.

In contrast, in the subject invention, the ends of the waveguides are spaced from the mirrors at least 10 mm and preferably 20 mm away. Rather than use the prior art theory for mirror shape and placement, it has been found preferable to first optimize the resonator design for the unstable resonator dimension. Once the location and radius of curvature of the mirrors has been determined, the actual length of the waveguide electrodes are determined to optimize the spacing in view of the curvature of the mirrors. More specifically, the spacing between the ends of the electrodes and the mirrors is selected so that the radius of curvature of the wavefront of the beam as it reaches the mirrors matches the radius of curvature of the mirrors.

Figure 14:
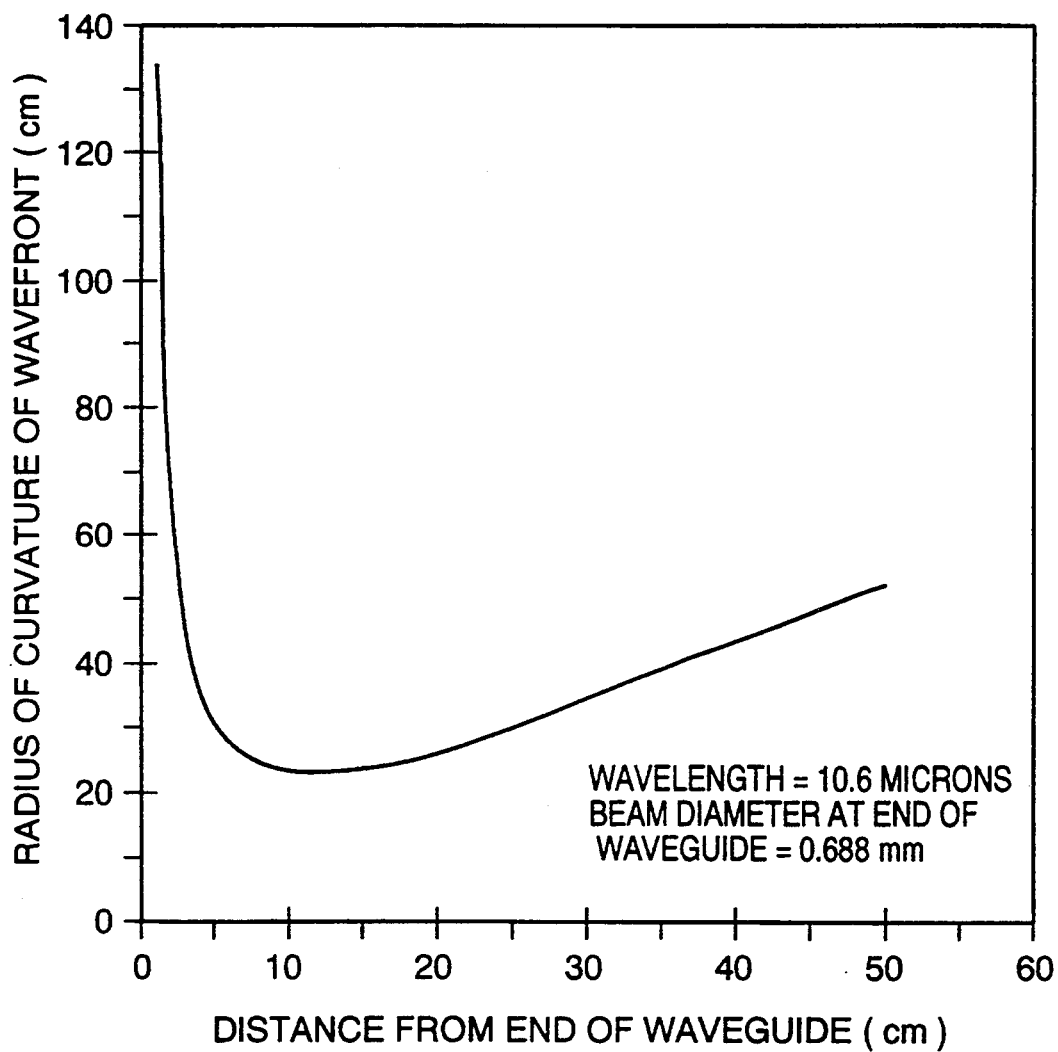
FIG. 14 is a plot of the radius of the wavefront as a function of the its distance from the end of the waveguide.

The relationship between the radius of curvature of the wavefront with respect to the distance from the end of the waveguide is illustrated in FIG. 14 In this plot, it is assumed that the light has a wavelength of 10.6 microns, has a planar wavefront when exiting from a 1.9 mm square waveguide and that the mode structure of the light is substantially equivalent to a $TEM_{00}$ mode. If the radius of curvature of the mirrors is known, the desired spacing can easily be matched. It is believed that this approach results in substantially all of the light being returned back into the waveguide except from effects due to diffraction.

It should be understood that this resonator design approach is significantly different from prior art teachings. For example, according to prior art theory, for a 1.9 mm square waveguide, one would use mirrors having a radius of curvature of 850 mm and a spacing from the end of the waveguide of 850 mm for a Type II resonator. In a Type III resonator the radius of curvature would be 260 mm at a distance of 130 mm from the end of the waveguide. An analysis of the subject structure using prior art theory would indicate that one should expect to experience a loss of roughly 15%. Experimental measurements confirmed that this resonator structure was as efficient as those used in the prior art, yet was more stable, and subject to less degradation. In addition, enhanced mode operation was achieved.

Figure 15:
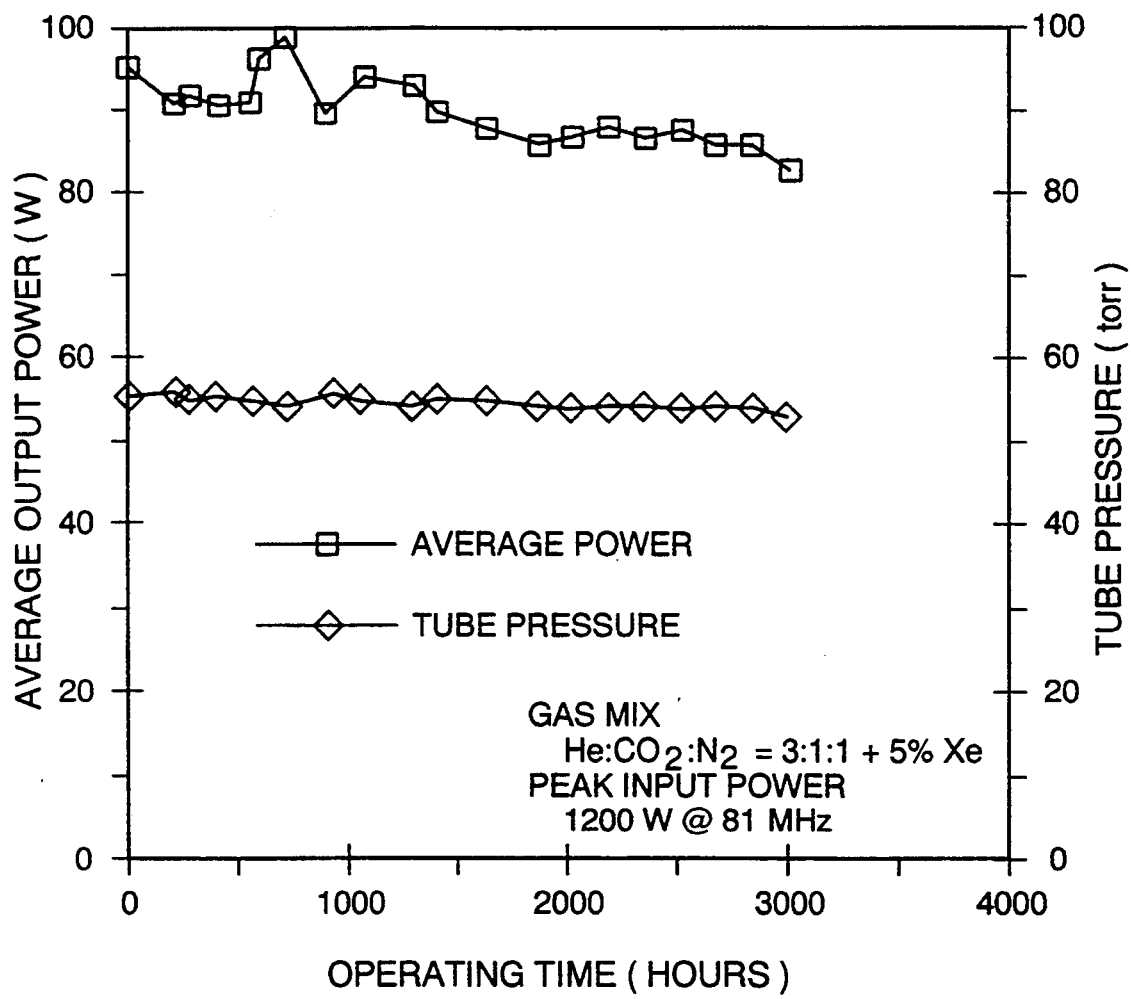
FIG. 15 is a plot of the average output power over time of a laser constructed in accordance with the subject invention.

FIG. 15 is a plot of the average output power with operating time of a 60 cm slab laser operating in a pulsed mode. The peak RF input power is 1200 Watts with a pulse length of 500 μs and a 50% duty cycle. The RF power was delivered at a frequency of 81.4 MHz to this laser and the gas mix was three parts helium to one part $CO_2$ to one part nitrogen and five percent xenon. The RF and gas mix parameters are the same for the tests shown in FIGS. 16 through 19. The total pressure is also plotted in FIG. 15 and shows no significant changes from 56 torr over the duration of this test.

Figure 16:
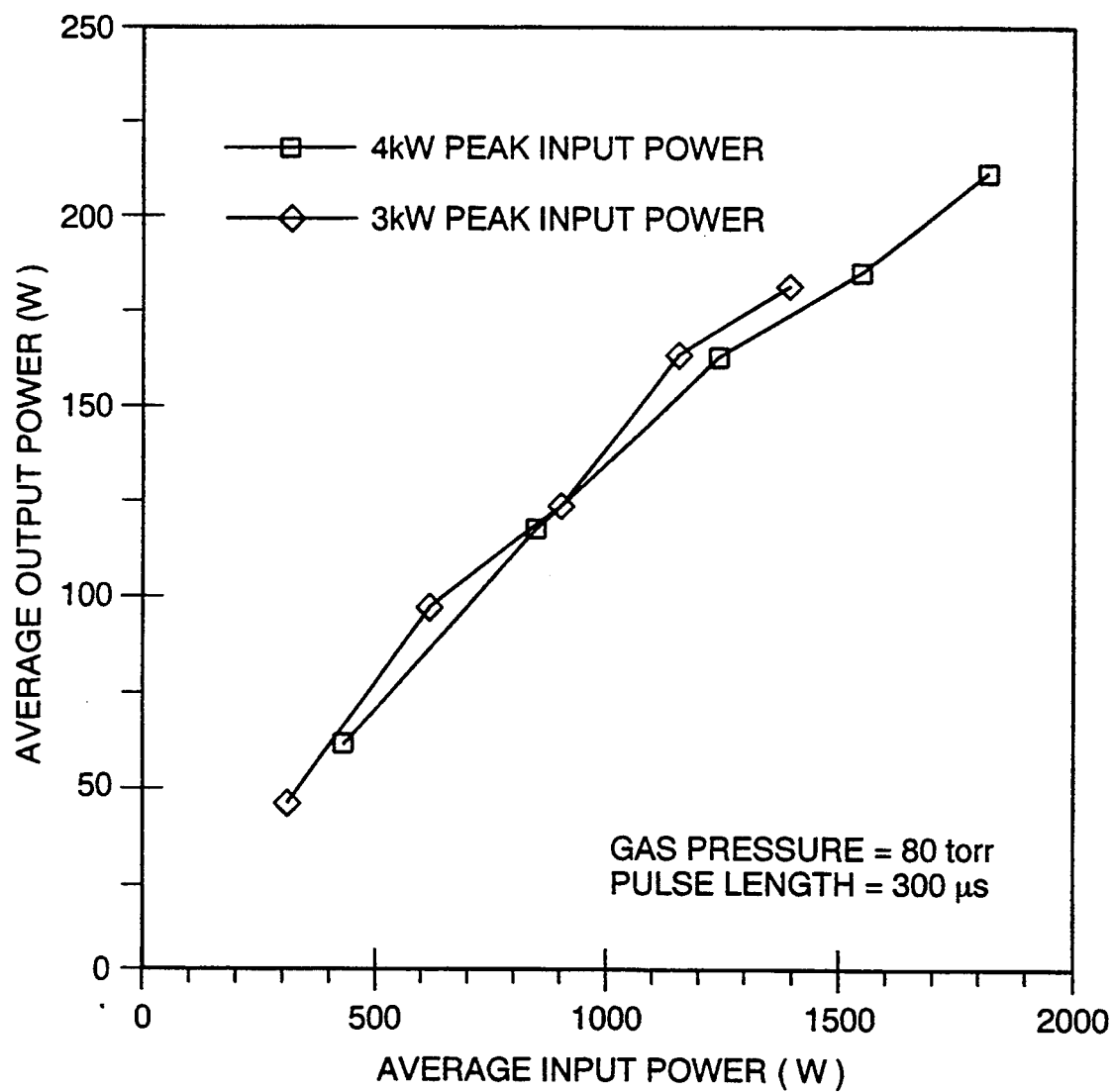
FIG. 16 is a plot of the average output power as a function of RF input power of a laser constructed in accordance with the subject invention.

FIG. 16 shows the average output power of a 60 cm slab laser as a function of the average RF input power. The tube had an operating pressure of 80 torr and was operated in a pulsed mode with 300 μs pulse length and duty cycles of 10% to 50%. The peak RF power was set to 3 kW and 4 kW peaks.

Figure 17:
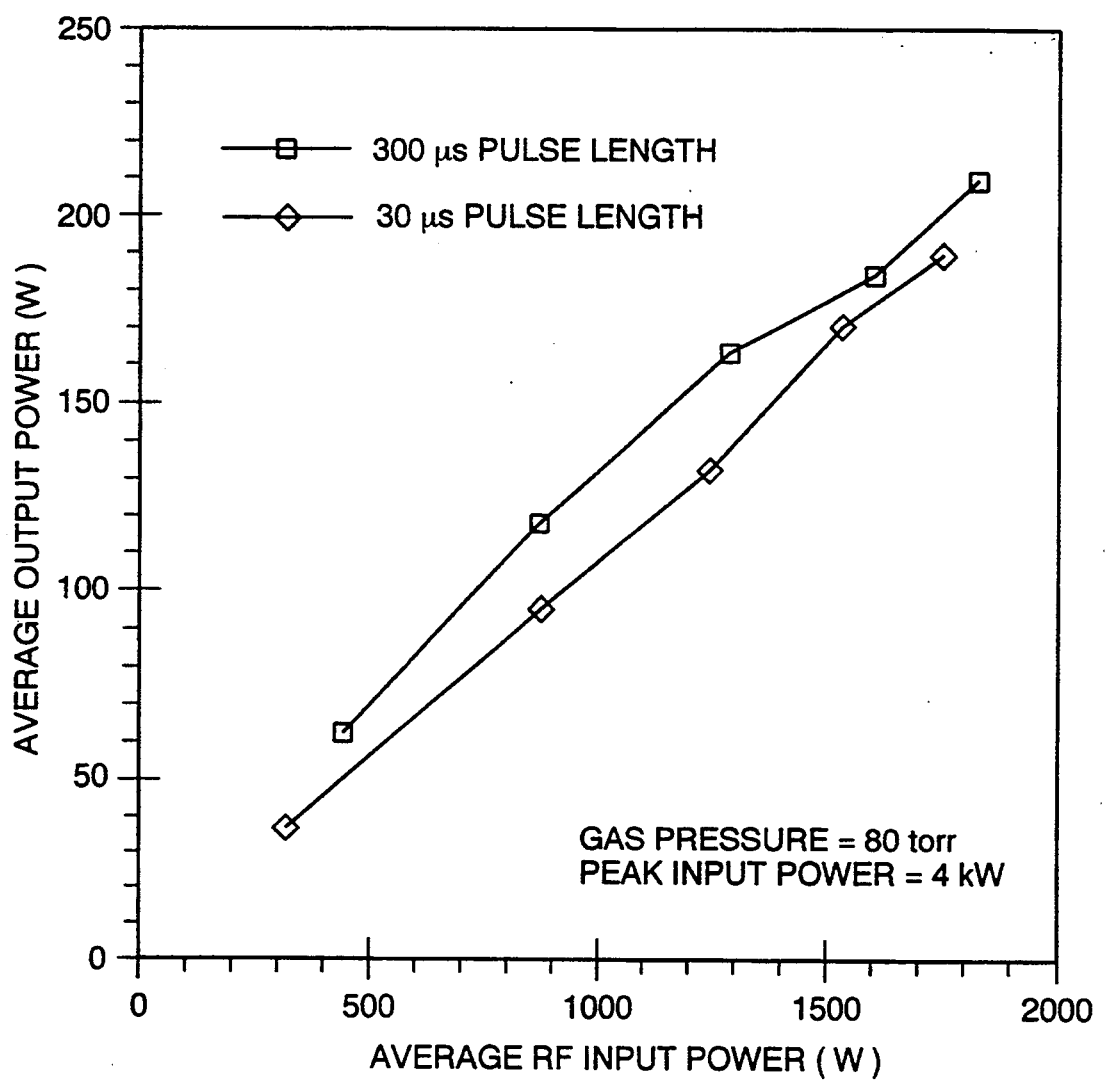
FIG. 17 is a plot similar to FIG. 16 showing the effects of different pulse lengths.

FIG. 17 shows the effect on the average output power of operating the tube with different pulse lengths. It was operated in a pulsed mode with pulse length of 30 μs and 300 μs for duty cycles ranging from 10% to 50%.

Figure 18:
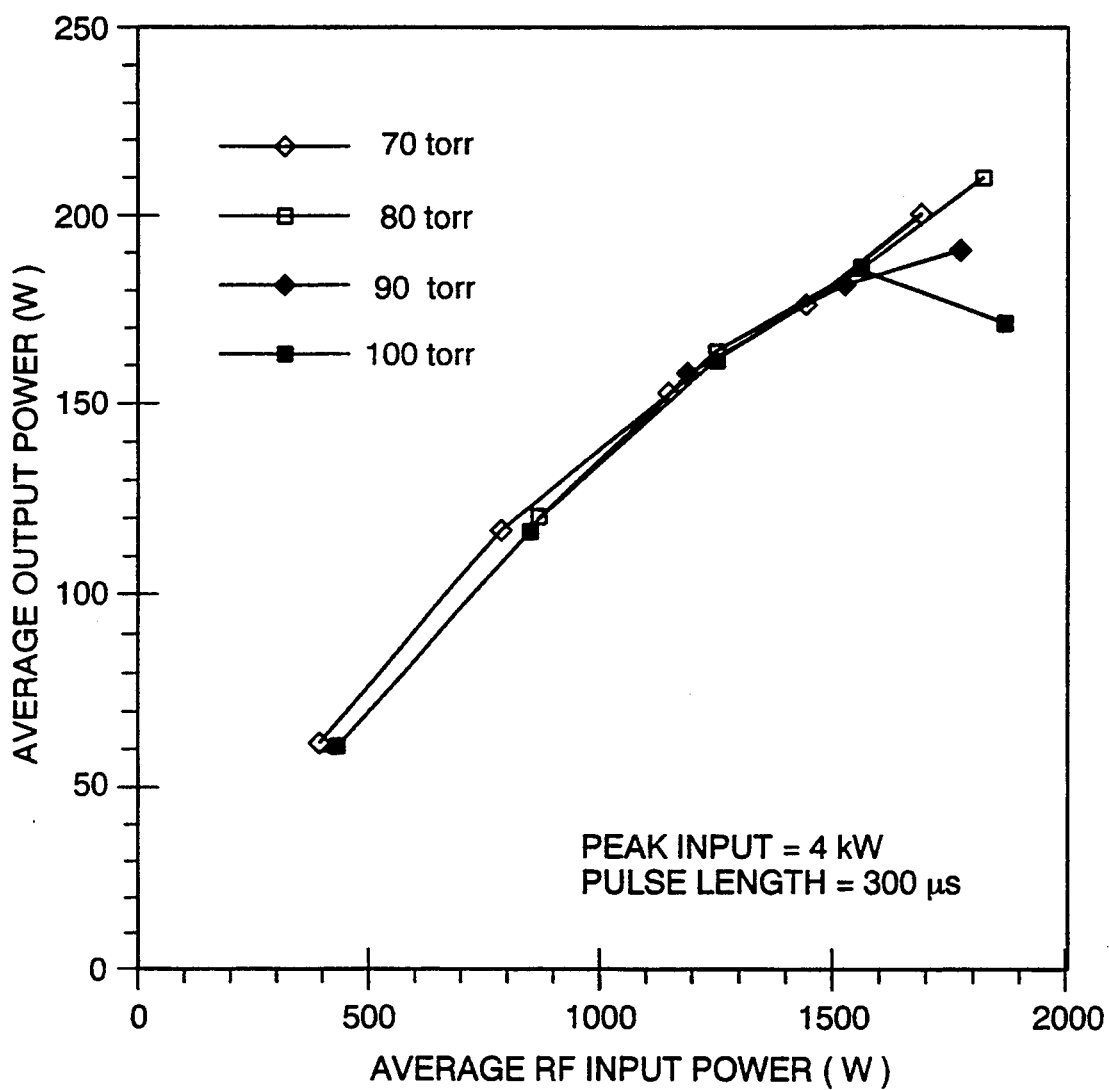
FIG. 18 is a plot similar to FIG. 16 showing the effects of different gas pressures within the laser.

FIG. 18 shows the change in the average output power with increasing average RF input power for various gas pressures. For pulsed power of 4 kW and 300 μs pulse length, the major variations in performance at these various gas pressures occurs only at the highest average powers of about 1800 W.

Figure 19:
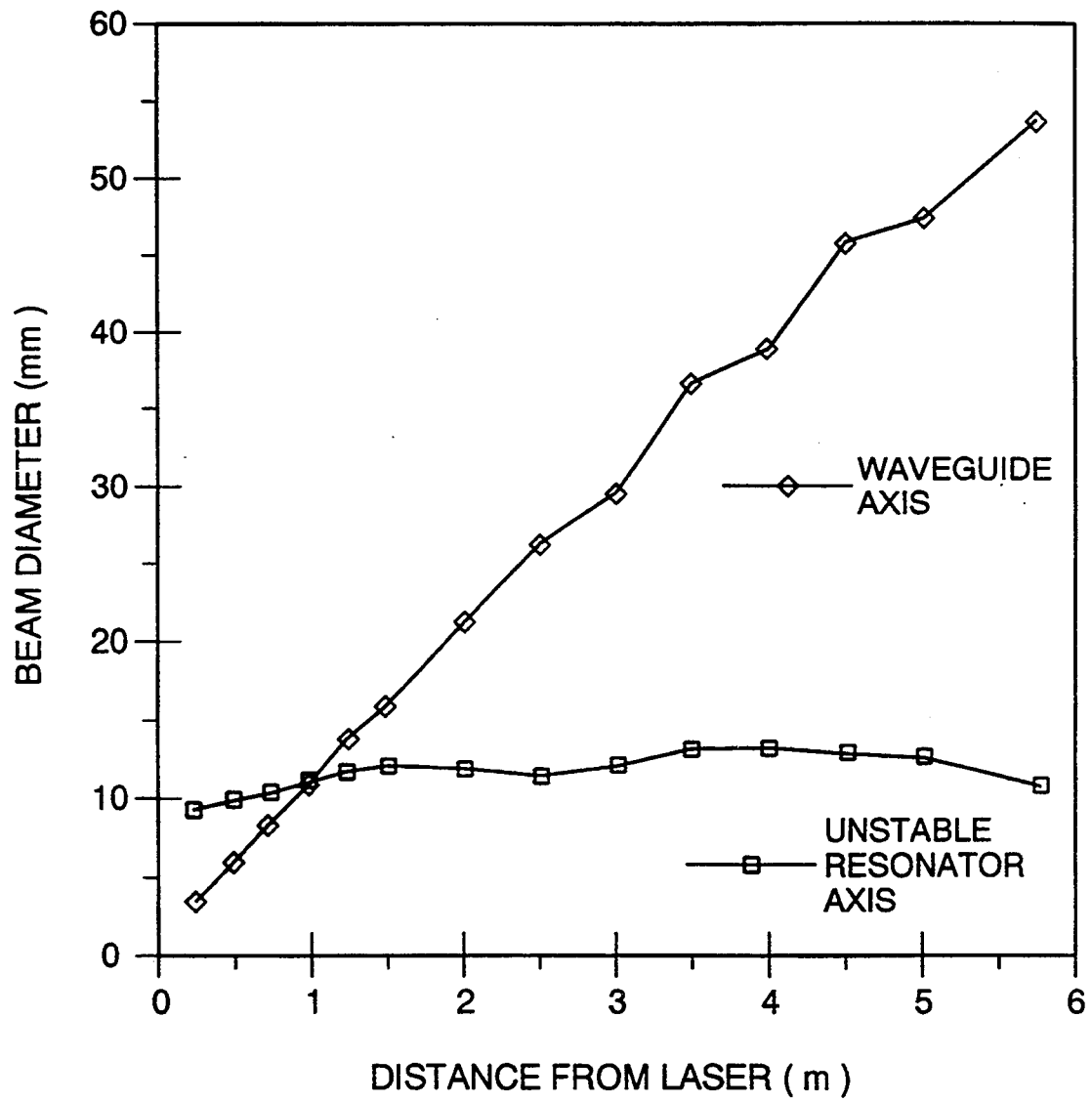
FIG. 19 is a plot illustrating the change in beam diameter as it propagates away from the end of a laser constructed in accordance with the subject invention.

FIG. 19 shows the change in beam diameter as the beam propagates away from the laser. The mode diameters were determined by measuring mode burns in ⅜ inch thick plexiglass made at about 100 W of output power. Curve fitting the beam diameter with distance indicates that this is consistent with an $M^2$ of 1.2 in both the waveguide axis and unstable resonator axis.

One advantage to the subject laser design is that it is able to quickly generate a high peak power and maintain that high peak power for the duration of the pulse. This ability can be important when the laser is used for medical procedures. More specifically, in medical procedures it is desirable to vaporize or ablate large surface areas of tissue. Typically, the surgeons prefer to work with spot sizes on the order of 3 to 4 mm in diameter for ablation as compared with smaller spot sizes, such as 1 mm, used for cutting. Laser ablation should be performed without damaging the surrounding tissue from thermal heat flow. This result can be achieved by using short time duration, high power pulses from the subject laser.

In most prior art $CO_2$ medical lasers, energies on the order of 50 millijoules per pulse could be delivered. In contrast, the subject laser can generate a peak power of 500 Watts (joules/second) for up to a millisecond at repetition rates of 500 Hz, which allows delivery of 500 milljoules per pulse, an order of magnitude greater. When these pulses are delivered in a beam having a diameter of 3 mm, an energy density of greater than 70 $mj/mm^2$ is achieved.

In experiments on tissue, it has been found that where the energy density per pulse exceeds 14 $mj/mm^2$ (about 100 mj for a 3 mm spot), the nature of the interaction of the beam with the tissue changes. The tissue remaining after ablation is found to be much cleaner with a more pronounced absence of char coupled with a thinner layer of damaged tissue. The desired pulse width should be less than one millisecond and preferably closer to 0.5 milliseconds. The cleaner tissue effects are also a function of the relatively short absorption length of the 10.6 micron $CO_2$ radiation. The absorption length of 10.6 micron radiation is less than 0.1 mm in tissue.

It has been found that each high energy pulse acts independently and removes a constant amount of tissue. Varying the pulse rate will vary the volume of tissue removed per second. As the skill of the surgeon increases, the pulse rate can be increased to allow for faster surgery. Short, high energy pulses could also be used for burn debridement in addition to tissue ablation.

In the preferred embodiment, it has been found desirable to operate with an energy per pulse of 200 millijoules when working with beam diameters of 3 mm or greater. This combination produces an energy density in excess of 28 $mj/mm^2$. With the laser operating with at peak power of 400 watts, the pulse width should be 0.5 milliseconds. When operated at 100 hz, the average power is 20 watts. These parameters produce a duty cycle of five percent. The duty cycle should be no greater than twenty percent and preferably less than ten percent to prevent the tissue from being heated in a cumulative manner by successive pulses. A low percentage duty cycle with 8 to 9 milliseconds between pulses allows the heat from each pulse to dissipate before the next pulse arrives.

If cutting is desired, the spot size can be reduced to 1 mm. The smaller spot will also give char free cutting.

When operating at higher power levels and fast repetition rates, there will typically be enough power to light the discharge and start the laser. However, at low powers, (ie. below 10 Watts average power) and low repetition rates (i.e. more than 50 milliseconds between pulse bursts), the large impedance mismatch between the RF generator and the unlit discharge makes the delivery of that energy difficult and noticeable delays can occur in exciting the discharge. One method of overcoming this problem would be to run the power supply in a simmer mode to keep the discharge lit and the laser generating minimal power.

In another approach, a means for preionizing the discharge can be provided to encourage the breakdown of the laser gas. In the preferred embodiment, this means is provided by a lamp installed within the housing and shown in phantom line at 110 in FIG. 5. Lamp 110 is a low pressure mercury-argon quartz lamp available from Jelight of Laguna Hills, Ca., part number 81-3306-2. It is believed that the ultraviolet light (185 and 254 nanometers) from this lamp functions to dissociate the molecules in the gas promoting the discharge. The use of the lamp also allows the gas to be maintained at a higher pressure which increases output power.

In the lasers built by the applicants, the lamp is mounted beyond the immediate discharge region, above the hot electrode. Greater efficiency could be achieved if the lamp were mounted in a location such that the ultraviolet radiation could reach the discharge more directly. It would also be possible to mount the lamp outside of the housing and opposite a window which transmitted the ultraviolet radiation into the housing.

As shown in FIG. 4, the RF energy can be coupled to the hot electrode at one end thereof. This approach has been found suitable for short electrodes, on the order of 40 cm. When 60 cm electrodes were employed, it was found that better performance was achieved if the RF energy was coupled into the electrode at center of its length. In tests to scale the laser to even longer lengths, it was found that delivery of the RF energy at a single point created an uneven discharge since the length of the electrode began to correspond to the length of the RF waves.

Figure 20:
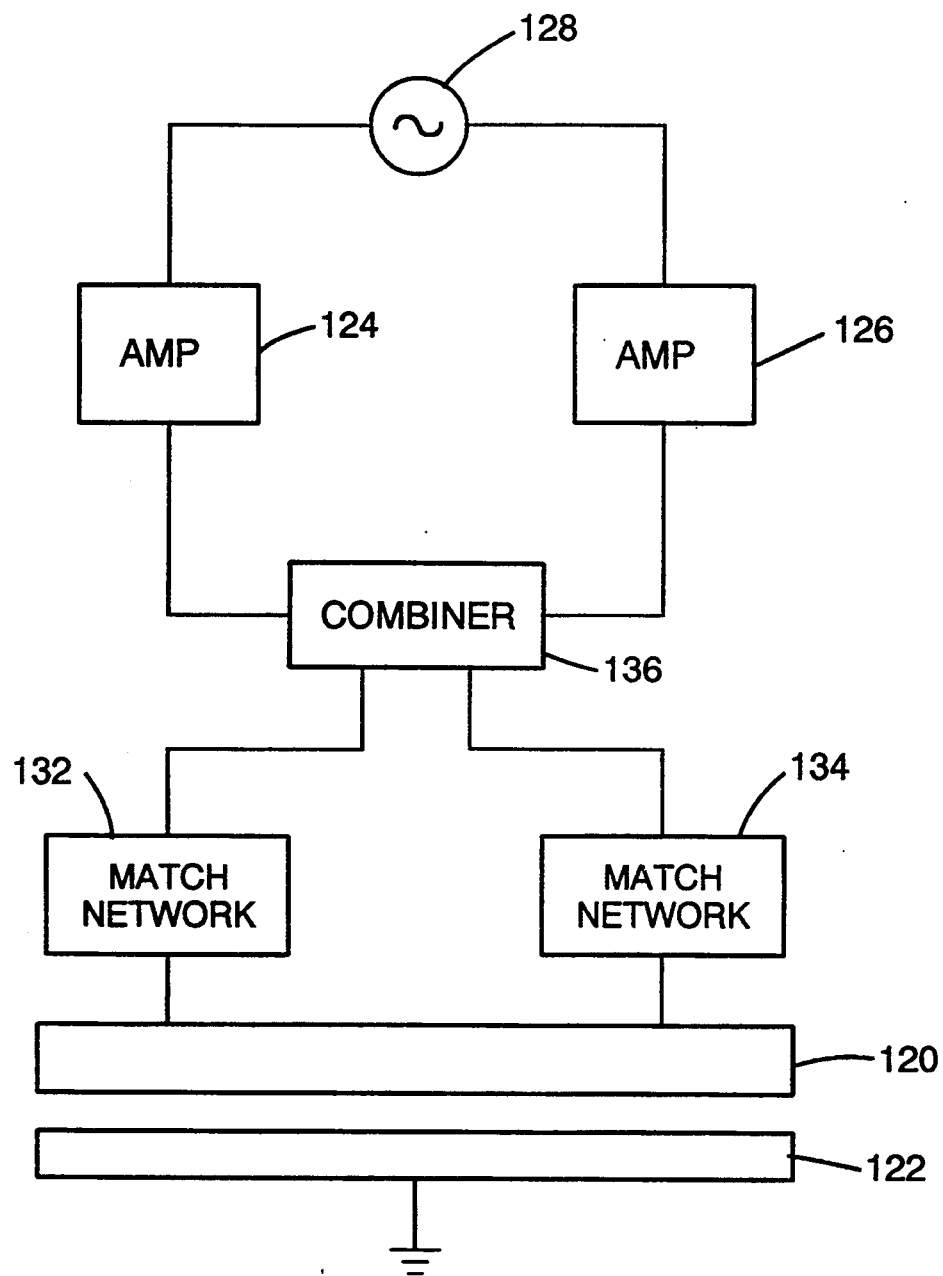
FIG. 20 is a schematic diagram illustrating the coupling of the RF excitation energy to multiple points on the hot electrode.

Accordingly, when the electrode length is 80 cm or longer, it is desirable to couple the RF energy into the electrodes at more than one location. However, the RF energy coupled into the laser at both points must be in phase. FIG. 20 illustrates the one approach to achieve this result.

The laser in FIG. 20 includes a pair of electrodes 120 and 122. The RF energy is coupled to the hot electrode 120 at two locations. The energy is generated by a pair of amplifiers 124 and 126 which are driven by a common oscillator 128 which keeps the amplifiers in phase. The output from the amplifiers is passed through individual impedance matching networks 132 and 134 to the hot electrode. A combiner 136 can be interposed between the amplifiers 124, 126 and the respective matching networks 132, 134 to control the interaction between amplifiers and the load provided by the laser tube so that each amplifier will provide the same power to the laser. All of the electrical leads should be of the same length to insure that the energy delivered to both points on the electrode 120 is in phase. Using this approach, a more stable and even discharge can be maintained.

Although not illustrated, an additional mechanism to reduce degradation of the mirrors would be to add ceramic spacers to the ends of the waveguide electrodes. The ceramic spacers would still function to guide the light, but the discharge would terminate at the end of the aluminum electrodes. The ceramic material would interact with neutral and ionic molecular fragments to reduce their diffusion toward the mirror surface. If left to diffuse toward the mirror surface, these molecular fragments are believed to lead to degradation of the mirror surface.

In summary, there has been disclosed a $CO_2$ slab waveguide laser. The laser includes a pair of spaced apart electrodes having opposed light reflecting surfaces. The electrodes are dimensioned in a manner to guide light in a plane perpendicular to the reflecting surfaces. Light parallel to the reflecting surfaces is not constrained other than by the resonator mirrors. The resonator structure includes a negative branch unstable resonator in the nonwaveguide dimension. A stable resonator is used in the waveguide dimension but the mirror spacing from the end of the guide is based in part on the configuration of the unstable resonator.

A unique support structure is disclosed for maintaining the electrodes in a spaced apart orientation without confining the discharge. Further refinements are disclosed for cooling the laser and for accommodating thermal expansion of the parts. Finally, an improved adjustable mirror assembly is provided which allows the tilt angle of the mirror to be varied from outside of the housing.

The subject laser is capable of generating short, high energy pulses suitable for treating tissue.

While the subject invention has been described with reference to a preferred embodiment, various changes and modifications could be made therein, by one skilled in the art, without varying from the scope and spirit of the subject invention as defined by the appended claims.

We claim:

1. A slab laser comprising:
   a pair of elongated, spaced apart electrodes, having opposed, light reflecting surfaces;
   a laser gas disposed between said electrodes;
   means for exciting said laser gas to create a gas discharge; and
   a pair of spherical mirrors surrounding said electrodes to define a resonant cavity, with the configuration of said mirrors being selected such that a stable waveguide resonant cavity is defined along a first axis extending between said light reflecting surfaces and an unstable resonator is defined along a second axis perpendicular to said first axis and wherein the length of the electrodes are chosen such that the radius of curvature of the wavefront of the laser beam in the first axis at the mirror location substantially matches the radius of curvature of the mirrors selected for the unstable resonator.

2. A slab laser as recited in claim 1 wherein said means for exciting the gas includes an RF generator, the output of which is coupled to one of said electrodes 3. A slab laser as recited in claim 1 wherein said unstable resonator is of the negative branch type.

4. A slab laser as recited in claim 1 wherein the light reflecting surfaces of said electrodes are planar.

* * * * *